Jan. 27, 1970    V. W. BOLIE    3,491,377
SELF-TRIGGERING STANDBY VENTRICLE FOR HEART ASSIST
Filed Dec. 20, 1967    4 Sheets-Sheet 1
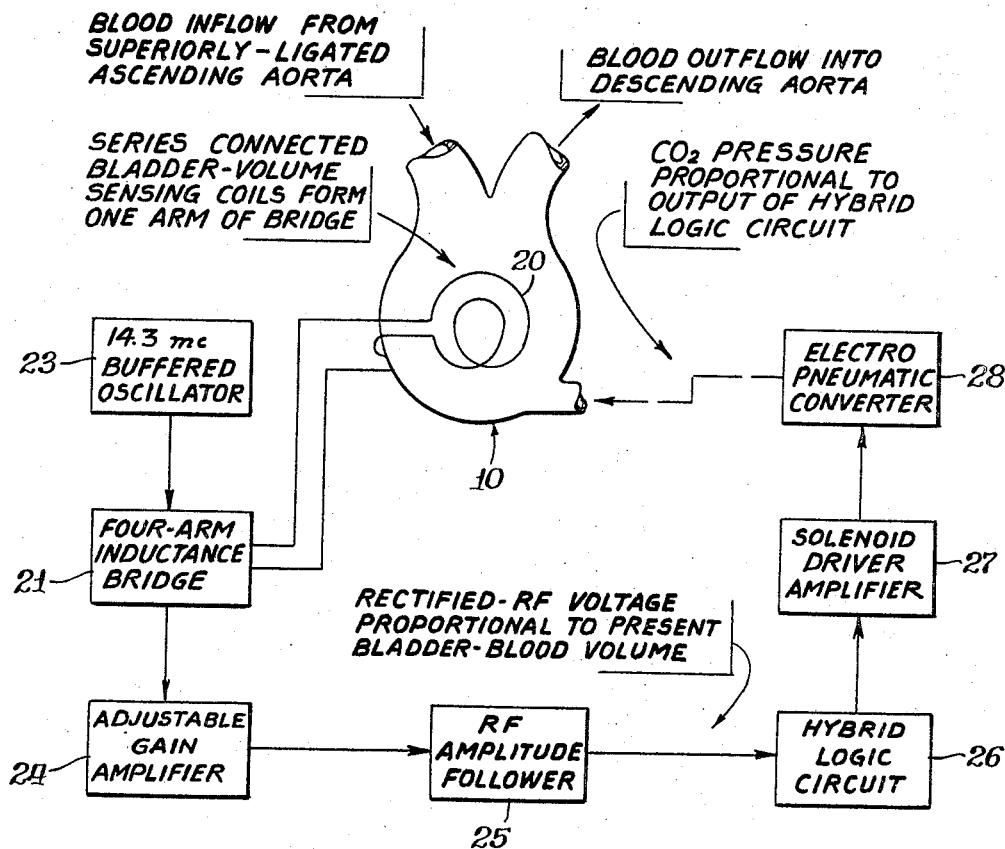
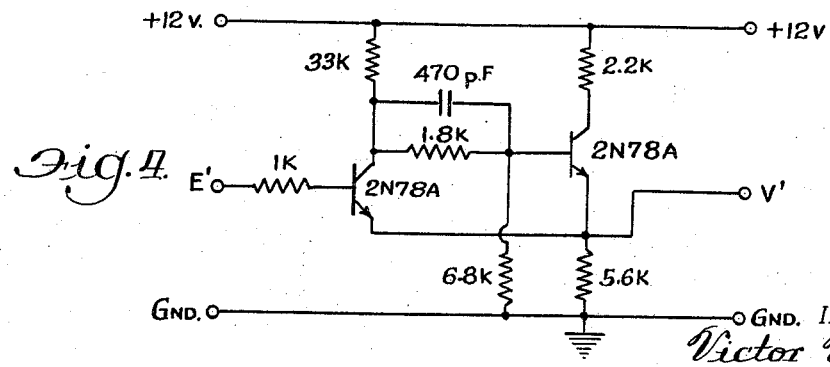
INVENTOR:
Victor W. Bolie
BY
Dawson, Tilton, Fallon & Lungmus
Attys.

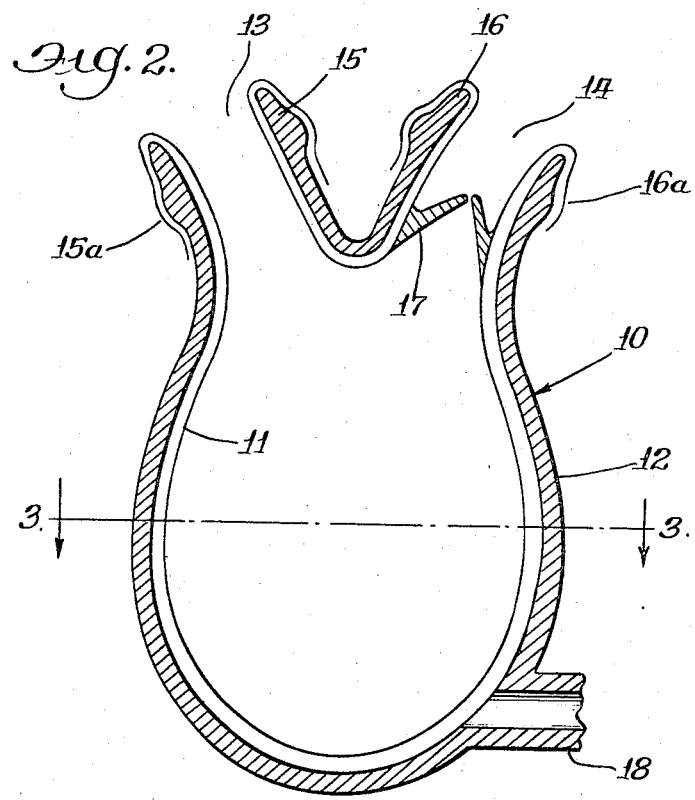
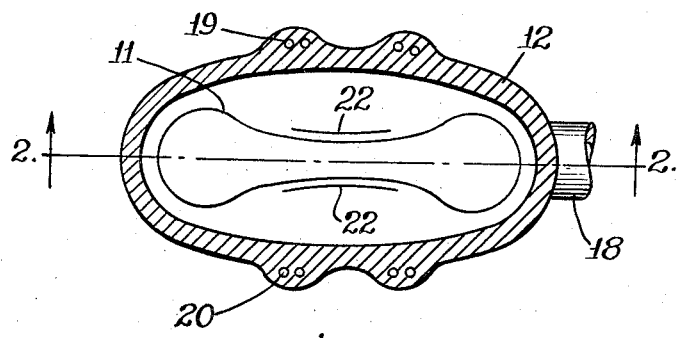

INVENTOR:
Victor W. Bolie
BY
Dawson, Tilton, Fallon & Lungmus
Attys.

United States Patent Office 3,491,377
Patented Jan. 27, 1970

3,491,377
SELF-TRIGGERING STANDBY VENTRICLE FOR HEART ASSIST
Victor W. Bolie, Stillwater, Okla., assignor to Advanced Technology Corporation, Costa Mesa, Calif., a corporation of California
Filed Dec. 20, 1967, Ser. No. 692,079
Int. Cl. A61b 1/00, 19/00
U.S. Cl. 3—1
8 Claims

ABSTRACT OF THE DISCLOSURE

This disclosure presents a heart-assist apparatus capable of bypassing blood around a surgically installed clamp across the ascending aorta. The apparatus effects a single artificial diastole-systole cycle immediately and only after each and every asystole in the natural heart, but otherwise serves only the passive function of an elastically capacitive fluid element in series with the heart. The apparatus includes an elastic bladder encased within an outer shell. The bladder has a first opening adapted to communicate with the superiorly ligated ascending aorta and a second opening adapted to communicate with the descending aorta. A valve associated with the second opening permits blood to flow from the bladder to the descending aorta but not in reverse. Electro-mechanical means including a variable inductance element in the shell provides an analog signal in proportion to the instantaneous volume of the bladder. The analog signal is delivered to a hybrid logic circuit including a Schmitt-triggered gate, and the output of the hybrid logic circuit is in turn delivered to an electro-pneumatic converter for causing a gas pressure to be supplied in proportion to the circuit output voltage. The varying gas pressure is applied exteriorly to the bladder within the outer shell. During normal heart operation the gas pressure varies approximately in linear relationship to the bladder volume. However, in the event of cardiac asystole the exterior bladder pressure will reduce the bladder volume below a first predetermined level which will activate the Schmitt-triggered gate to suddenly reduce the exterior bladder pressure to a relatively low level to allow easy inflow of blood. When the bladder volume increases to a second predetermined bladder volume level, the Schmitt-triggered gate returns the output of the circuit to equivalence with the analog signal, and the pressure resumes its linear variation with bladder volume.

BACKGROUND OF THE INVENTION

This invention relates to artificial hearts, and, more particularly, to a self-triggering standby ventricle which is capable of effecting a single artificial diastole-systole cycle immediately and only after each and every asystole in the natural heart.

In the past many types of heart prostheses have been provided, but all of these various artificial heart devices have encountered certain difficulties. For example, one problem of the complete artificial heart is that all of the natural heart tissue is permanently deactivated upon surgical installation of the prosthesis. Several left-ventricular-bypass units have been provided, but these units may cause blood stagnation and danger of emboli generated during periods in which the prosthesis is inactive. A problem of the doubly valved compressible segment inserted as a replacement for the ascending aorta is that the coronary arteries are not pressurized at any time. If the conventionally operated singly-valved compressible segment is inserted as a replacement for the ascending aorta, the prosthesis must be removed surgically to allow pressurization of the coronary arteries during diastole if normal function should resume. Valveless counterpulsated aortic segments do not provide sufficient pumping action in cases of total left-ventricular failure.

SUMMARY OF THE INVENTION

These and other problems are eliminated by my invention, which includes a self-triggering standby ventricle capable of transporting blood out of the superiorly ligated ascending aorta and into the descending aorta through a single passive valve which never closes during normal heart function. My invention also includes a hybrid logic control system which is capable of effecting a single artificial diastole-systole cycle immediately and only after each and every asystole in the natural heart, with self-adaption of artificial pulse rate and artificial systolic pressure to accommodate variability in the systemic blood pressure and rate of bloodflow issuing from the pulmonary system. This heart-assist function is achieved without measurement of electro-cardiograph signals, bloodflow rate, or direct blood pressure. Means are also provided for increasing the elastance of the arterial system by any desired amount.

DESCRIPTION OF THE DRAWING

FIG. 1 is a schematic illustration of the components of my self-triggering standby ventricle;

FIG. 2 is a sectional elevational view of the blood transport unit taken along the line 2—2 of FIG. 3;

FIG. 3 is a sectional view taken along the line 3—3 of FIG. 2;

FIG. 4 is a schematic illustration of the Schmitt-trigger circuit of the hybrid logic circuit;

DESCRIPTION OF A SPECIFIC EMBODIMENT

Figure 5:
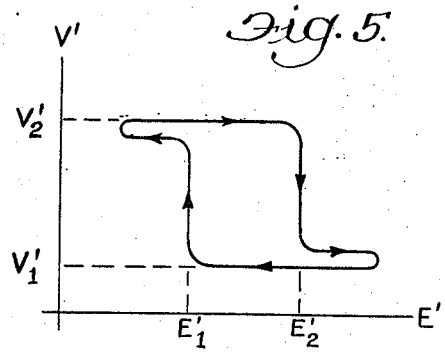
FIG. 5 illustrates the relationship between the input and output signals for the Schmitt-trigger circuit of FIG. 4.

Referring now to FIGS. 1–3, the numeral 10 designates generally a blood-transport unit which includes an elastic bladder 11 encased within a relatively rigid outer shell 12. The blood transport unit 10 is provided with ports 13 and 14 provided by tube-like extensions 15 and 16 of the shell. Port 13 is adapted to be connected to a superiorly ligated ascending aorta of a heart, and port 14 is adapted to be connected to the descending aorta. The transport unit 10 may be positioned grossly in various surgical ways in the patient. The outer shell 12 may be formed of any suitable viable nontoxic material. Alternatively, the transport unit 10 may be positioned outside of the patient and the ports 13 and 14 may be connected to the aorta through the chest wall.

The bladder 11 is seen to be folded reversely over shell extensions 15 and 16 to provide eversion seals as at 15a and 16a, and port 14 is provided with a one-way flap valve 17 attached to the bladder which permits blood to flow from the bladder into the descending aorta but not reversely from the descending aorta into the bladder. A gas-pressurizing conduit 18 communicates with the interior of the shell 12 to permit a suitable pressurizing gas such as carbon dioxide to be introduced into the space between the exterior of the bladder and the interior of the shell.

As can be seen in FIGS. 1 and 3, the shell 12 is generally oval in transverse cross section, and sensing coils 19 and 20 are embedded in, or attached to opposite sides of the shell. The coils are connected in series to form one arm of a four arm inductance bridge 21 (FIG. 1), and the sides of the bladder 11 adjacent to the coils 19 and 20 carry metal foil discs or rings 22 (FIG. 3). The four-arm inductance bridge 21 receives its electrical excitation from a suitable RF oscillator 23. Variations in the bladder volume result in variations in the distance between the metal discs 22 and the sensing coils 19 and 20 and corresponding variations in the amplitude of the sinusoidal voltage output of the inductance bridge 21. For example, as the bladder volume expands and the discs 22 approach the sensing coils, the total series inductance of the sensing coils decreases and the amplitude of the sinusoidal output voltage of the bridge correspondingly increases. Conversely, as the bladder volume decreases the amplitude of the output voltage of the inductance bridge decreases. The output of the inductance bridge 21 is therefore a measure of the bladder volume. A four arm capacitance bridge may be used in place of the inductance bridge if desired.

Referring to FIG. 1, the analog signal output of the inductance bridge 21 is delivered to an adjustable-gain amplifier 24 and then to the RF amplitude follower 25, consisting of a rectifying diode and a simple low-pass filter. The rectified RF voltage output of the amplitude follower 25 is thus proportional to the instantaneous bladder volume, and this voltage is delivered to hybrid logic circuit 26.

As long as the heart is functioning normally the hybrid logic circuit 26 will deliver an output signal linearly related to its input signal. The output of the hybrid logic circuit 26 is delivered to an electro-pneumatic converter which can be any one of many available devices for causing a gas pressure to be generated rapidly in proportion to an electrical current. The electro-pneumatic converter will thus be used to deliver a suitable gas such as $CO_2$ to the gas pressurizing conduit 18 of the shell 12 under a pressure linearly related to the output of the hybrid logic circuit. One convenient electro-pneumatic converter includes an electrical solenoid which pushes a plastic ball against a counterbored gas-escape orifice, thereby generating an electrically variable gas pressure upstream from the escape orifice. If need be, this electrically variable pressure can be amplified for any desired amount by the use of proportional fluid amplifiers, such as the "pressure-area amplifier" available commercially from the Fluidonics Division, Imperial-Eastman Corporation, Chicago, Ill. Experiments with fluid amplifiers of the type described in U.S. Patent No. 3,024,805 show that if the control pressure is such that the main power flow is caused to issue from only one of the two exit conduits, there exists at the other conduit a mild suction with respect to the atmospheric or pump-return pressure. Hence, to some extent the $CO_2$ pressure can be biased independently of the electrical bias of the hybrid logic circuit 26 if desired in making final adjustments of the system. In the particular illustration given, the output of the hybrid logic circuit 26 is delivered to a solenoid driver amplifier 27, which drives the solenoid provided as part of the electro-pneumatic converter 28. The electro-pneumatic converter 28 is associated with a suitable pressurized gas source such as a cylinder of pressurized $CO_2$, and a pressure which is linearly related to the output of the hybrid logic circuit 26 may thereby be applied exteriorly of the bladder 11.

The hybrid logic circuit 26 consists of several component parts, one of which is a Schmitt-trigger circuit such as that shown in FIG. 4. The relationship between the input and output signals for the Schmitt-trigger circuit is illustrated schematically in FIG. 5. If the input signal level $E'$ is not large, the output signal level $V'$ remains at a constantly high level $V_2'$. However, as the input $E'$ is elevated slowly past an upper critical level $E_2'$, or a first action threshold, the output $V'$ suddenly drops to the low level $V_1'$ and does not depart appreciably from this low level until the input $E'$ is considerably reduced below the upper critical level $E_2'$. As the input $E'$ is further reduced slowly past a lower critical level $E_1'$, a second action threshold, the output $V'$ suddenly rises to is original high level $V_2'$. The fixed voltage levels $E_1'$, $E_2'$, $V_1'$, and $V_2'$ are determined by the particular values of the various components used in the Schmitt-trigger circuit.

Figure 6:
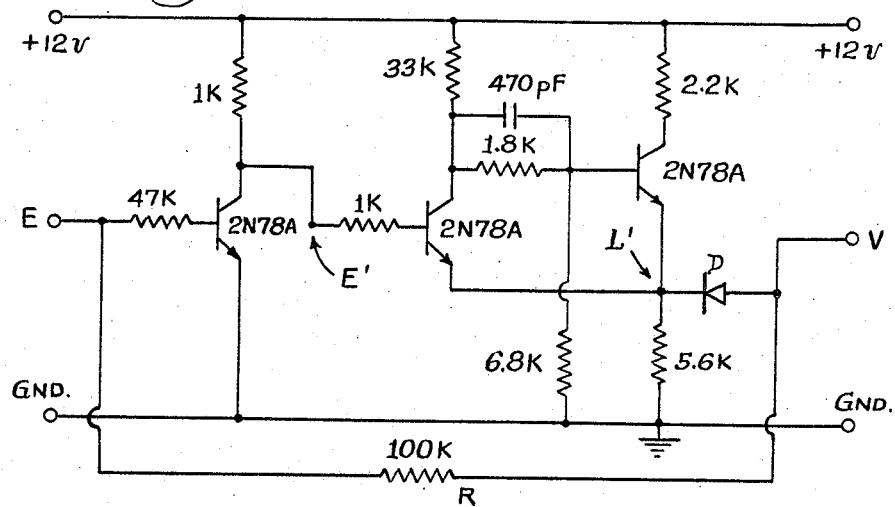
FIG. 6 is a schematic illustration of the hybrid logic circuit.

The design of the hybrid logic circuit 26 is illustrated in FIG. 6. The overall hybrid circuit has an input signal voltage E delivered by RF amplitude follower 25 and an output signal voltage V. The hybrid logic circuit of FIG. 6 includes a standard Schmitt-trigger circuit of FIG. 4 as one of its subsections. The Schmitt-trigger portion of the circuit has an input signal voltage $E'$ and an output signal voltage $V'$. By means of the illustrated single phase-inverting amplifier stage, $E'$ is made equal to $E_c - E$, where $E_c$ is equal to the potential of the power supply bus (12 volts in the circuit shown). By means of the diode D and the 100,000-ohm resistor R, the equality of the hybrid circuit output V to the inpu E is made subject to the state of the biasing action of the Schmitt-trigger ouput $V'$.

Figure 7:
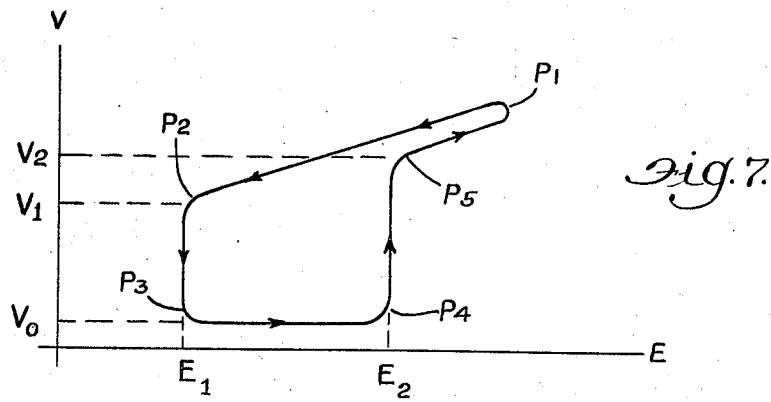
FIG. 7 illustrates the relationship between the input and output signals for the hybrid logic circuit of FIG. 6.

The relationship between the input and output signals for the composite hybrid-logic circuit is shown schematically in FIG. 7. The $P_1$–$P_2$ portion of the input-output characteristic is a linear relationship between the input signal voltage E and the output signal voltage V. If by any means the initial mode of operation of the circuit is caused to be on the linear $P_1$–$P_2$ portion, it will remain on this sector for all excursions of E in either direction, provided only that E is not permitted to fall below the lower critical level $E_1$. If the input voltage E should fall below $E_1$, the output V will suddenly fall to the very low level $V_0$, and will not depart appreciably from this low level until the input E is considerably elevated above the lower critical level $E_1$. As the input E is further increased slowly past the upper critical level $E_2$, the output V suddenly rises to again place the mode of operation of the circuit on the linear $P_1$–$P_2$ portion.

During normal heart function the blood-transport unit 10 behaves elastically like a section of the normal aorta, keeping the exit valve 17 open and keeping the coronary arteries pressurized at all times. The bladder 11 will expand and contract regularly, and the bladder volume will vary between an upper and lower value, for example, 150 cc. and 50 cc. The values of the various electrical components of the apparatus are chosen so that during normal heart operation when the bladder volume remains within the normal range, the output of the hybrid logic circuit 26 will vary approximately linearly with its input, and the gas pressure delivered to the exterior of the bladder 11 through gas pressurizing conduit 18 will likewise vary approximately linearly with the bladder volume. More specifically, if the bladder volume normally varies between 150 cc. and 50 cc., the critical input voltage $E_1$ and $E_2$ will be chosen to bracket the variations in the analog input voltage to the hybrid logic circuit.

Figure 8:
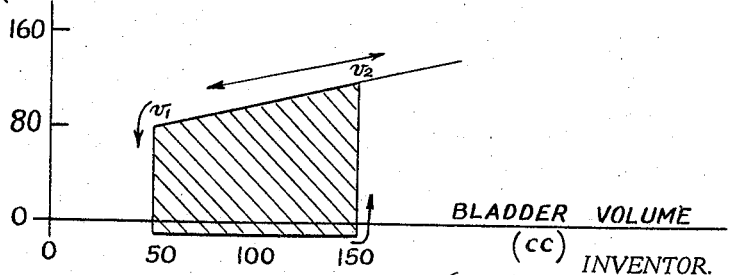
FIG. 8 illustrates the variation of external bladder pressure with the variation of bladder volume.

Referring to FIG. 8, the linear relationship between bladder volume and $CO_2$ pressure is seen to be in effect as long as the bladder volume remains above a lower predetermined value $v_1$, 50 cc. in the illustration given. If the heart stops for even one beat, the exit bloodflow from the blood transport unit will be uncompensated, and the exterior $CO_2$ pressure on the bladder 11 will squeeze the bladder down to a volume less than $v_1$. Since $E_1$ (FIG. 7) of the hybrid logic circuit is chosen to correspond to the lower critical volume $v_1$ of the bladder, if the bladder volume drops below $v_1$, the input voltage to the hybrid logic circuit will fall below $E_1$ and the output V of the circuit will suddenly fall to the very low level $V_0$ (FIG. 7). An output of only $V_0$ from the hybrid logic circuit will cause the $CO_2$ pressure to drop (FIG. 8) to a pre-set suction level of about −10 mm. Hg relative to the atmosphere, and will expand the bladder, drawing blood from the superiorly ligated ascending aorta. The bladder pressure remains at the −10 mm. Hg suction level, with blood backflow from the descending aorta blocked by the valve 17, until the easy inflow of blood dilates the bladder volume to more than a second predetermined critical bladder volume $v_2$, which in FIG. 8 is 150 cc. The components of the hybrid logic circuit are chosen so that $E_2$, the upper critical level of the circuit, corresponds to the input to the circuit when the bladder volume is $v_2$. When the bladder volume expands to the upper critical level $v_2$ and the input voltage to the hybrid logic circuit reaches the upper critical value $E_2$, the Schmitt-triggered gate of the hybrid logic circuit suddenly unclamps the analog output voltage, and the output voltage V suddenly rises again to restore the linear relation between the output and input of the circuit (FIG. 7). Once the heart resumes its normal function, the blood transport unit resumes its passive function of an elastically capacitive fluid element in series with the heart, and the coronary arteries are not deprived of blood pressure during diastole.

As heretofore mentioned, the fixed voltage levels $E_1$, $E_2$, $V_0$, and $V_2$ identified in FIGS. 6 and 7 are determined by the particular values of the various components used in the hybrid logic circuit. I have found that it is advantageous to make the value of $V_0$ as nearly equal to zero as feasible, which requires that the input-to-output coupling resistor R be substantially greater than the 5.6K output resistor of the particular Schmitt-trigger circuit illustrated in FIG. 4.

The slope and midpoint height of the passive segment (upper boundary line) of the shaded pressure-volume loop illustrated in FIG. 8 are set by the gain in the RF amplifier 24 and the bias in the hybrid logic circuit 26. Automatic adaption to changes in systemic blood pressure is afforded by making these two variables slowly responsive to any changes in the DC component and the AC pulse frequency in the output of the RF amplitude follower 25.

Figure 9:
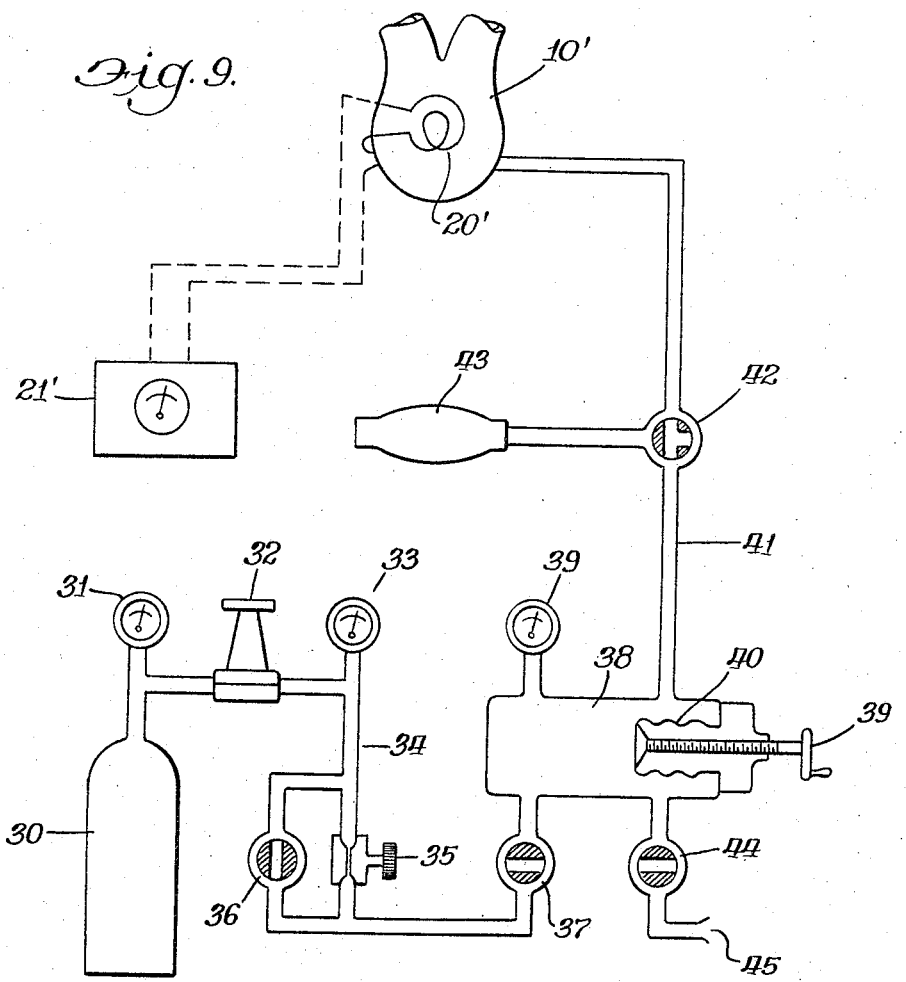
FIG. 9 is a schematic illustration of an alternative embodiment of my heart-assist apparatus designed for manual operation.

FIG. 9 illustrates an alternative embodiment of my heart-assist apparatus for manual operation. The blood transport unit 10' is provided with sensing coils 20' which are connected to a bladder volume indicator 21' which shows the changes in the output voltage of a suitable inductance bridge. The gas pressure source is provided by high pressure gas cylinder 30 of $CO_2$ or other suitable gas. In order to initially fill the gas conduit system to a pressure approximating the arterial blood pressure of the patient, and to replenish any slow gas leaks which might inadvertently develop, provision is made for the gas to pass through cylinder pressure meter 31, adjustable pressure regulator 32, and reduced pressure meter 33 into cnduit 34. The gas then passes either through adjustable bleeder resistance 35 or, for rapidly filling the system, through stop cock 36 provided for bypassing the bleeder 35, and then through stop cock 37 into adjustable volume tank 38 provided with pressure meter 39. The volume of tank 38 may be adjusted by means of crank 39 and bellows 40, and, with the system initially pressurized and with stopcock 37 closed, the variable volume tank 38 may provide any desired degree of supplementary aortic elasticity which the surgeon desires in the case of each particular patient at any particular time. The blood transport unit 10' communicates with the tank 38 through conduit 41 and stopcock 42. The hand massage bulb 43 may be connected to the space between the bladder and outer shell of the blood transport unit whenever desired by means of stopcock 42 to facilitate manual pumping of blood through the prosthesis 10' during heart failure. The operator observes the volume of the bladder as indicated by bladder volume indicator 21' and makes any necessary corrections to the average eternal bladder pressure by means of pressure regulator 32, bleeder 35, and stopcocks 37 and 44. The stopcock 44 and vent 45 to the atmosphere also permit the entire system to be purged and refilled with a new gas supply whenever desired.

I claim:
1. A self-triggering standby ventricle including a shell-encased, singly-valved, pliable bladder adapted to be surgically arranged to receive blood from the superiorly ligated ascending aorta and to expel blood into the descending aorta, pneumatic means for applying pressure exteriorly of said bladder, electrical means for measuring the instantaneous volume of said bladder, means responsive to said electrical measuring means for varying said exterior pressure in an approximately linear relationship to said instantaneous bladder volume, said pressure varying means suddenly reducing said pressure to a relative suction level when said bladder volume falls below a first predetermined value and suddenly returning said pressure to conformity with said linear relationship to said instantaneous bladder volume when said bladder volume rises above a second predetermined value.

2. The apparatus of claim 1 in which said exterior pressure increases approximately linearly with the bladder volume as long as the bladder volume varies above said first predetermined value.

3. The apparatus of claim 1 in which said bladder means includes a first opening adapted to communicate with the ascending aorta of the heart and a second opening adapted to communicate with the descending aorta of the heart, a valve associated with said second opening, said valve closing when said pressure is reduced to the suction level, whereby blood is prevented from flowing from the descending aorta to said chamber.

4. The apparatus of claim 1 in which said pressure varying means includes a hybrid logic circuit, said electrical measuring means delivering an analog signal to said hybrid logic circuit, said circuit including gate means having a first action threshold associated with said first predetermined value and a second action threshold associated with said second predetermined value.

5. The apparatus of claim 4 in which said pressure varying means includes electro-pneumatic converter means responsive to said hybrid logic circuit for varying the pressure applied to said bladder means in relation to the output signal of said hybrid logic circuit.

6. A heart-assist apparatus comprising a relatively rigid shell, an elastic bladder encased within said shell, said bladder having a first opening adapted to communicate with a superiorly ligated ascending aorta and a second opening adapted to communicate with a descending aorta, a valve associated with said second opening permitting blood flow out of said bladder but not into said bladder, a pressurized gas source communicating with the interior of said shell for applying pressure exteriorly of said bladder, electrical means for measuring the instantaneous volume of said bladder, said electrical measuring means providing an output signal, electropneumatic means responsive to said signal for varying the pressure within said shell in linear relation to said instantaneous bladder volume during periods of normal heart function, said pressure varying means reducing the pressure to a relative suction level when the bladder volume falls below a first predetermined level and returning said pressure to said linear relation to said instantaneous bladder volume when the bladder volume rises above a second predetermined level.

7. The apparatus of claim 6 in which said pressure varying means varies the pressure approximately linearly with respect to the instantaneous bladder volume as long as the bladder volume remains above the first predetermined level.

8. The apparatus of claim 6 in which said pressure varying means includes a hybrid logic circuit having a Schmitt-triggered gate and an electro-pneumatic converter responsive to said hybrid logic circuit, said hybrid logic circuit providing in a first mode of operation an analog output signal varying linearly with the bladder volume variations as long as said bladder volume does not fall below a first predetermined volume level, said hybrid logic circuit automatically switching to a second mode of operation to provide a relatively low and constant output signal if said bladder volume falls below said first predetermined level, said second mode of operation then persisting until said bladder volume rises above a second predetermined level after which said hybrid logic circuit automatically switches back to said first mode of operation.

References Cited

UNITED STATES PATENTS

| | | | |
|---|---|---|---|
| 3,182,335 | 5/1965 | Bolie | 3—1 |
| 3,337,878 | 8/1967 | Bolie | 3—1 |
| 3,425,064 | 2/1969 | Carnevale et al. | 3—1 |
| 3,426,743 | 2/1960 | Chesnut et al. | 128—1 |

OTHER REFERENCES

Siedel et al.: Trans. Amer. Soc. Artific. Inter. Orgs., vol. VII, 1961, pp. 378–385.

Hiller et al.: Trans. Amer. Soc. Artific. Inter. Orgs. vol. VIII, 1962, pp. 125–130.

Nose et al.: Trans. Amer. Soc. Artific. Inter. Orgs., vol. IX, 1963, pp. 269–274.

DALTON L. TRULUCK, Primary Examiner

U.S. Cl. X.R.

128—1